United States Patent [19]
Kaplan

[11] Patent Number: 5,101,368
[45] Date of Patent: Mar. 31, 1992

[54] CONVERSION CALCULATOR

[76] Inventor: Seymour Kaplan, 750 State St. #124, San Diego, Calif. 92101

[21] Appl. No.: 209,208

[22] Filed: Jun. 20, 1988

[51] Int. Cl.⁵ .............................................. G06F 7/00
[52] U.S. Cl. ............................................... 364/715.05
[58] Field of Search ................... 364/715.05, 709.07, 364/709.03

[56] References Cited

U.S. PATENT DOCUMENTS

| | | | |
|---|---|---|---|
| 3,973,113 | 8/1976 | Goldsamt | 364/709.07 |
| 4,092,523 | 5/1978 | Tava et al. | 364/715.05 X |
| 4,100,602 | 7/1978 | Shapiro | 364/715.05 |
| 4,228,516 | 10/1980 | Johnston, Sr. | 364/715.05 X |
| 4,290,113 | 9/1981 | Haker et al. | 364/715.05 X |
| 4,319,130 | 3/1982 | Spitzner | 364/715.05 |
| 4,481,598 | 11/1984 | Ishiwata | 364/715.05 X |
| 4,545,022 | 10/1985 | Hughins | 364/709.07 |
| 4,686,643 | 8/1987 | Ishiwata | 364/715.05 |
| 4,744,044 | 5/1988 | Stover et al. | 364/737 |

FOREIGN PATENT DOCUMENTS

| | | | |
|---|---|---|---|
| 1173164 | 8/1984 | Canada | 364/709.07 |
| 2755403 | 6/1979 | Fed. Rep. of Germany | 364/715.05 |
| 47661 | 3/1984 | Japan | 364/715.05 |

*Primary Examiner*—Tan V. Mai
*Attorney, Agent, or Firm*—Frank D. Gilliam

[57] ABSTRACT

A small hand held calculator capable of performing the normal arithmetical calculations expected of a calculator of this general type. In addition, the calculator is capable of achieving conversions from any measurement unit to an equivalent value in another selected measurement unit by converting the input measurement unit into a standard unit of measurement and converting that standard unit of measurement into a selected unit of measurement. In addition, any recipe can be converted from a number of servings to any other number of servings and/or a desired portion size can be converted from any given recipe portion size. The data input keyboard comprises a plurality of data input keys with specific indicia thereon including columns of keys for volumes, weights, lengths, recipe servings including the number of servings, portion size, resulting number of servings desired and portion size. The data input keys further include the conventional numbers 0-9 and arithmetical function keys.

8 Claims, 3 Drawing Sheets

CONVERSION CALCULATOR

BACKGROUND OF THE INVENTION

The present invention is directed to calculators and more particularly to a hand held calculator which in addition to performing the conventional arithmetical calculations also performs conversions particularly directed to converting given units of measurements into different selected units of measurements and converting the serving quantities of recipes into different serving quantities and/or converting given recipe portion sizes to selected different portion sizes. All of the recipe conversions being directly related to the original converted recipe so as to maintain the same expected culinary result in the conversion.

The prior art includes at least the following U.S. Pat. Nos. 4,100,602; 4,244,020; 4,290,113; 4,321,674; 4,092,523 and 4,405,991.

U.S. Pat. No. 4,100,602 which is now assigned to the inventor of the present invention. In this patented invention, .recipe conversions are performed in a different manner. In this patent the calculation operation converts input data and required output data into a ratio and uses that ratio to perform each of the final calculations. There is no means provided for changing the serving quantity of a given recipe to a different serving quantity while altering the portion size of that given recipe to a different portion size simultaneously. Additionally, the referenced calculator does not have available an expanded number of different units of measure.

U.S. Pat. Nos. 4,224,020 and 4,321,674 relate to calorie conversions and accumulation devices which further accumulate calories as one of the three units which are limited to carbohydrates, protein and fat.

U.S. Pat. No. 4,405,991 is dedicated only to cooking times for food type, amount of food and desired results.

U.S. Pat. Nos. 4,092,523 and 4,290,113 are conversion calculators. In U.S. Pat. No. 4,092,523 conversions may be made from one type of unit to many other types of units through a conversion ratio for each conversion pair. The example used for this calculator is monetary conversions as between monies of different countries. This calculator includes memory stored conversion factors. Chained conversion are not performed. Individual conversion factors are used for each conversion operation. In U.S. Pat. No. 4,290,113 only two systems of conversion units are available.

The present invention provides an advancement of the state of the art in small calculators by providing a more accurate and user friendly dedicated multi-function calculator for use in recipe conversions.

SUMMARY OF THE INVENTION

The calculator of the present invention has extreme conversion accuracy not before found in the present state of the art calculators of this type. An input of a unit of volume, weight or length can be entered into a memory as a common unit via a keyboard, that common unit can then be converted to any other unit value related to the input unit, i.e. quarts are converted to a common unit of volume, for example cubic meters, and that common unit of volume can then be directly converted to any other unit of volume such as tablespoon etc. These conversions can likewise be accomplished with weights by converting the input, for example, into kilograms and lengths by converting into, for example, meters. The calculator of the invention will reduce or expand recipe sizes by storing in memory the menu servings and/or serving size (weight) in memory and convert that stored information into any desired number of servings or serving sizes. That standard ratio will be stored in memory and be used to convert any recipe quantity into any other quantity or serving size. The input values and resulting conversions are displayed on a convenient visual display. The calculator of the present invention is also capable of performing the normal mathematical calculations and further includes timer functions, temperature conversions and fraction to decimal conversions.

An object of this invention is the conversion of units of measurement to a common unit of measurement and the conversion of that common unit of measurement to a different related unit of measurement with the minimum of steps which results in a minimum conversion error.

Another object of this invention is to provide an on key entry process for the conversion from a common unit to the desired conversion.

Still another object of the invention is to provide a dedicated calculator of the type defined herein which is capable of performing a plurality of different calculator functions with a minimum of complication.

Yet another object of the invention is to provide a key board with indicia on the keys which reduce the knowledge or experience required to operate the calculator in the manner expected.

Other features which are considered as characteristic for the invention are set forth in the appended claims.

Although the invention is illustrated as described herein in one embodied in a microprocessor, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantage thereof will best understood from the following description of specific embodiments when read in connection with the accompanying drawings, in which:

DETAILED DESCRIPTION OF THE FIRST PREFERRED EMBODIMENT OF THE INVENTION

Figure 1:
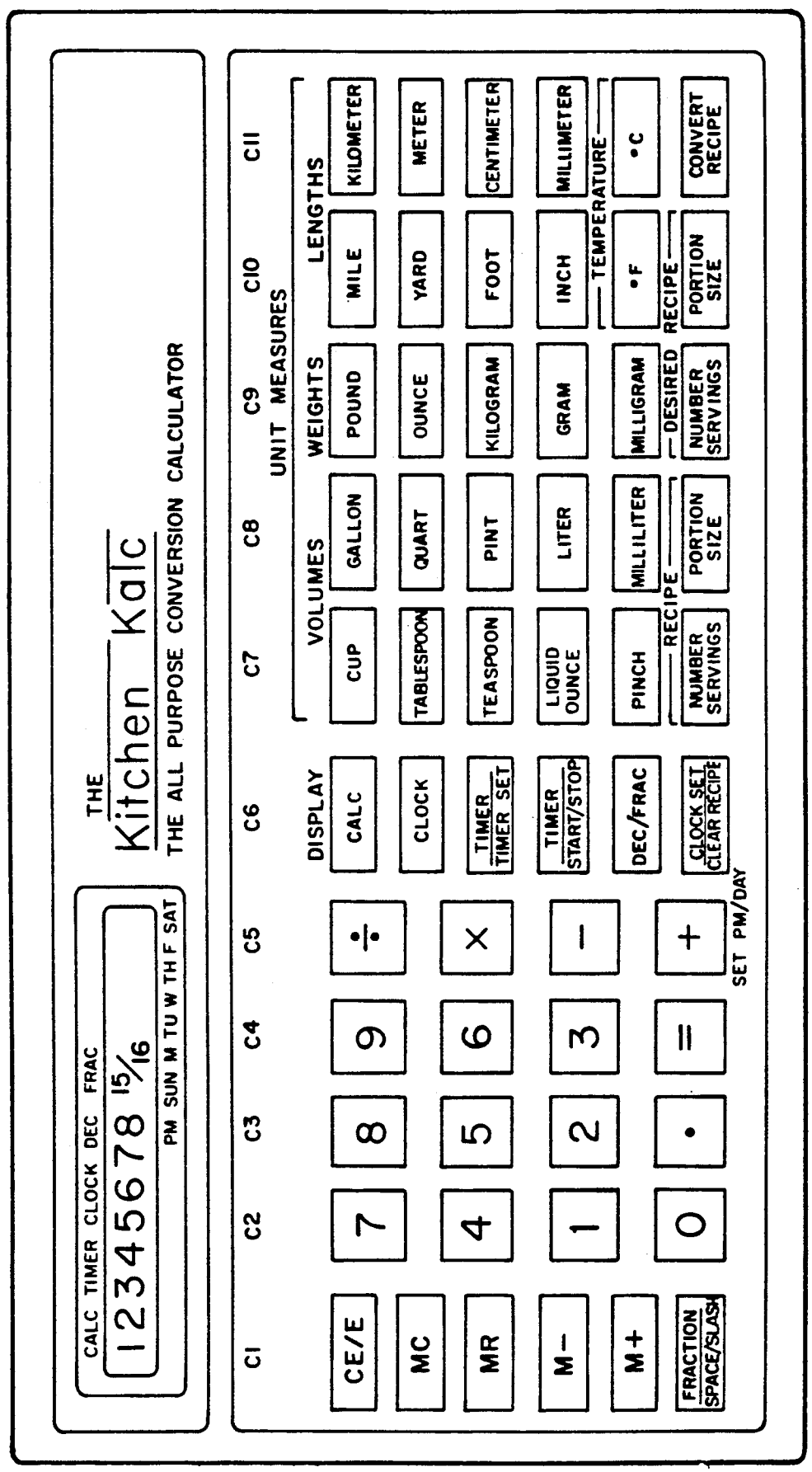
FIG. 1 is a plan view of the input key pad showing the various indicia thereon.
Figure 2:
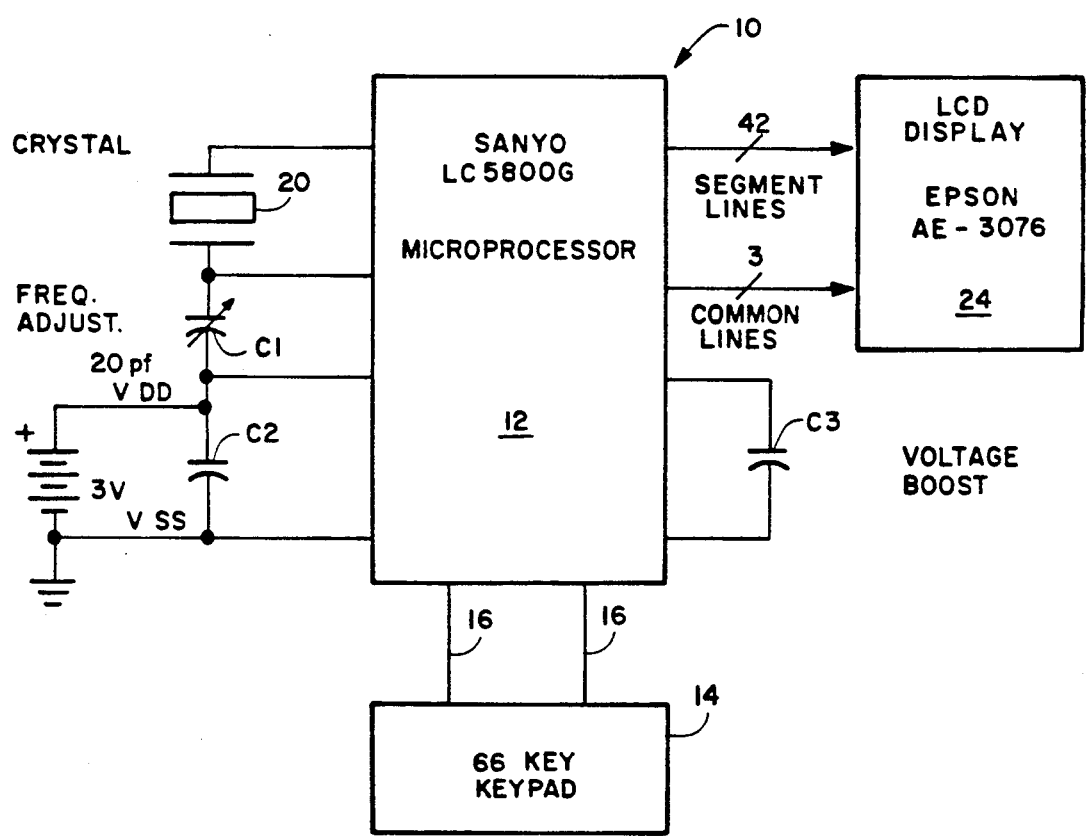
FIG. 2 is a schematic showing of the first preferred embodiment of the invention.

Referring now to the various drawing Figures, and particularly to FIGS. 1 and 2. FIG. 1 depicts a key board 14 which is employed in both the first and second embodiments of the invention. As can be readily seen in FIG. 1, the left hand side of the key pad includes columns 1-5 (C1, C2, C3, C4 and C5) with typical numerical keys 0-9 for performing normal mathematical functions such as, multiplication, addition and subtraction and division which is typical of known calculators. Special keys included are cancel, cancel last entry, memory, clock set keys and a combined special function fraction space/slash key. Positioned on the right hand side of the key board 10 are a plurality of special function keys 12. At the left hand side of the special function keys 12 is a vertical column of keys that control the visual display indications. The special function input data keys in column 6 (C6) include a CALC key for switching the calculator visual display to the calculation function after the power is applied, a CLOCK key for displaying the current local time, TIMER TIMER/SET key for switching the timer to the visual display and setting the internal timer function, TIMER TIMER/STOP KEY for starting and stopping the internal timer operation, a DEC/FRAC key for selecting fraction and decimal displays or conversions and a CLOCK SET CLEAR RECIPE key for setting the local time in the internal clock or clearing the recipe calculator function. The five columns (C7, C8, C9, C10 and C11) of data input keys to the right of the column 6 (C6) are identified as UNIT MEASURES and includes two columns of VOLUMES, one column of WEIGHTS an two columns of LENGTHS.

Column 7 (C7) includes data input keys for selecting input or output volume measurements including CUP, TABLESPOON, TEASPOON, LIQUID OUNCE, PINCH and under a RECIPE heading NUMBER OF SERVING. In column 8 (C8) the data input keys include GALLON, QUART, PINT, LITER, MILLILITER and under the heading "RECIPE" PORTION SIZE. In column 9 (C9) under the heading WEIGHTS the data input keys include POUND, OUNCE, KILOGRAM, GRAM, MILLIGRAM and under the heading "DESIRED RECIPE" NUMBER SERVINGS.

Columns C10 and C11 include keys under the heading LENGTHS and include data entry keys MILE, YARD, FOOT, INCH, KILOMETER, METER, CENTIMETER and under the heading timer two keys for degrees fahrenheit and degrees centigrade, under the heading "DESIRED RECIPE" PORTION SIZE and CONVERT RECIPE.

Referring now specifically to drawing FIG. 2, the block diagram of the first preferred embodiment 10 of the invention is shown. A central microprocessor 12 is shown interconnected to the keyboard 14 described above under the discussion directed to FIG. 1. The keyboard is interconnected through seventeen lines 16 (two shown). The microprocessor 12 is of the type LC 5800G manufactured by SANYO or an equivalent thereto. The Key pad is a conventional key pad having sixty six identified input keys. The microprocessor is frequency controlled by crystal 20 of 32.786 KHz which is adjustable over a narrow range by the adjustment of capacitor C1 of twenty pico farads. A power source 22 is provided to power the device. The power supply is shown to have 3 volts. A power supply of any convenient voltage can be employed. A capacitor C2 of 0.1 micro farads is connected across the power supply output.

The output of the microprocessor is interconnected through forty two information and three ground lines to a visual display 24. The visual display 24 is of the type AE-3076 manufactured by EPSON or an equivalent thereto. The display is of the LIQUID CRYSTAL DISPLAY (LCD) type. A capacitor C3 of 0.1 micro farad provides a boost voltage for the purpose of powering the LCD display. The interwiring of the various described elements are done according to the manufacturer's specifications.

In this embodiment, all units of volume are converted to cubic meters ($M^3$) when entered, and all calculations of volume are done internal to the microprocessor in this "STANDARD UNIT OF MEASURE". The units entered via the key pad are multiplied by the conversion factor. All converted units of volume are created by dividing the conversion factor of the unit selected into the resultant standard unit (M3) by selecting any volume unit of measure.

The recipe reduction or expansion mode will calculate a ratio from an actual menu in number of servings and/or serving size divided by the desired menu in number of servings and/or serving size. All inputs will be converted into a conversion factor unit of measure if a serving size is entered. If no serving size is entered, the numbers are simply retained as a ratio. More than one combination for both the actual menu and the desired menu may be imputed. Once a ratio is established any other volume or weight in either decimal or fraction form is input with the selected unit of measure key and appears on the display as the unit of measure selected, multiplied by that ratio. When any other unit of measure key is depressed, the original entered unit of measure is converted to the new unit of measure and then multiplied by the ratio. This will happen as many times as another unit of measure key is depressed.

Likewise, all units of weight are converted to kilograms (KG) when entered and all calculations of weight are performed within the microprocessor in this standard of measure. The entered units are multiplied by the conversion factor to KG as entered.

Similarly, all units of distance are converted to meters (m) when entered and all calculations of distance are performed within the microprocessor in this standard of measure. The entered units are multiplied by the conversion factor to meters as entered.

All temperature conversions are performed by applying the standard temperature conversion formula within the microprocessor in a known manner.

An example of recipe reduction or expansion is as follows:

The number of servings key is depressed and the recipe number of servings is entered via the numeral keys, the number of servings under the desired key is depressed, and the desired number of new servings is imputed via the numeral keys. A ratio is now established by dividing the number of servings in the original recipe by the number of desired servings. The established ratio is then used to convert input measurements into new measurements for the desired servings by imputing the original recipe volume and multiplying this entered volume by the stored ratio thereby producing new volume. This action is repeated until the entire constituents of the original menu are converted. If a different serving size is desired in the converted recipe than a ratio is established in the following manner:

The number of servings is entered by the number servings key under recipe column, the number of servings of the original recipe are then entered via the numeral keys, the portion size key under the recipe column is then depressed, the number of the servings of the original recipe are then entered via the number keys and the desired volume key under the unit measurement columns. The ratio established is equal to the number of servings in the original recipe times the number of desired servings times the volume of each serving desired, generally in ounces). If another number of servings and service size are entered, then the new converted value is added to the ratio numerator. This calculation can be repeated as many time as desired for the denominator, with the ratio updated each time another desired number of servings and service size is desired.

An example of the volume conversion factors to the standard unit of cubic meters is as follows:

| UNIT OF MEASURE | CONVERSION FACTOR |
|---|---|
| Teaspoon | $4.928922 \times 10^{-6}$ |
| Tablespoon | $1.478676 \times 10^{-5}$ |
| Cup | $2.365882 \times 10^{-4}$ |
| Ounce (liquid) | $2.957353 \times 10^{-5}$ |
| Pint (liquid) | $4.731765 \times 10^{-4}$ |
| Drop | $8.214870 \times 10^{-8}$ |
| Quart (liquid) | $9.463529 \times 10^{-4}$ |
| Gallon (liquid) | $3.785412 \times 10^{-3}$ |
| Peck | $8.809768 \times 10^{-3}$ |
| Bushel | $3.523907 \times 10^{-2}$ |
| Liter | $1.000000 \times 10^{-3}$ |

An example of the weight conversion factors to the standard unit of Kologram is as follows:

| UNIT OF MEASURE | CONVERSION FACTOR |
|---|---|
| Milligram | $1.000000 \times 10^{-6}$ |
| Gram | $1.000000 \times 10^{-3}$ |
| Ounce | $2.834952 \times 10^{-2}$ |
| Pound | $4.535924 \times 10^{-1}$ |
| Kilogram | $1.000000 \times 100$ |
| Dram | $1.771854 \times 10^{-3}$ |

An example of the distance conversion factors to the standard unit of is as follows:

| UNIT OF MEASURE | CONVERSION FACTOR |
|---|---|
| Millimeter | $1.0 \times 10^{-3}$ |
| Centimeter | $1.0 \times 10^{-2}$ |
| Inches | $2.54 \times 10^{-2}$ |
| Foot | $3.048 \times 10^{-1}$ |
| Yard | $9.144 \times 10^{-1}$ |
| Meter | $1.00$ |
| Kilometer | $1.0 \times 10^{3}$ |

An example of the temperature formula is as follows:

| UNIT OF MEASURE | CONVERSION FACTOR |
|---|---|
| °C. | $T°C. = (T°F. - 32) \div 1.8$ |
| °F. | $T°F. = (T°C. \times 1.8) + 32$ |

Figure 3:
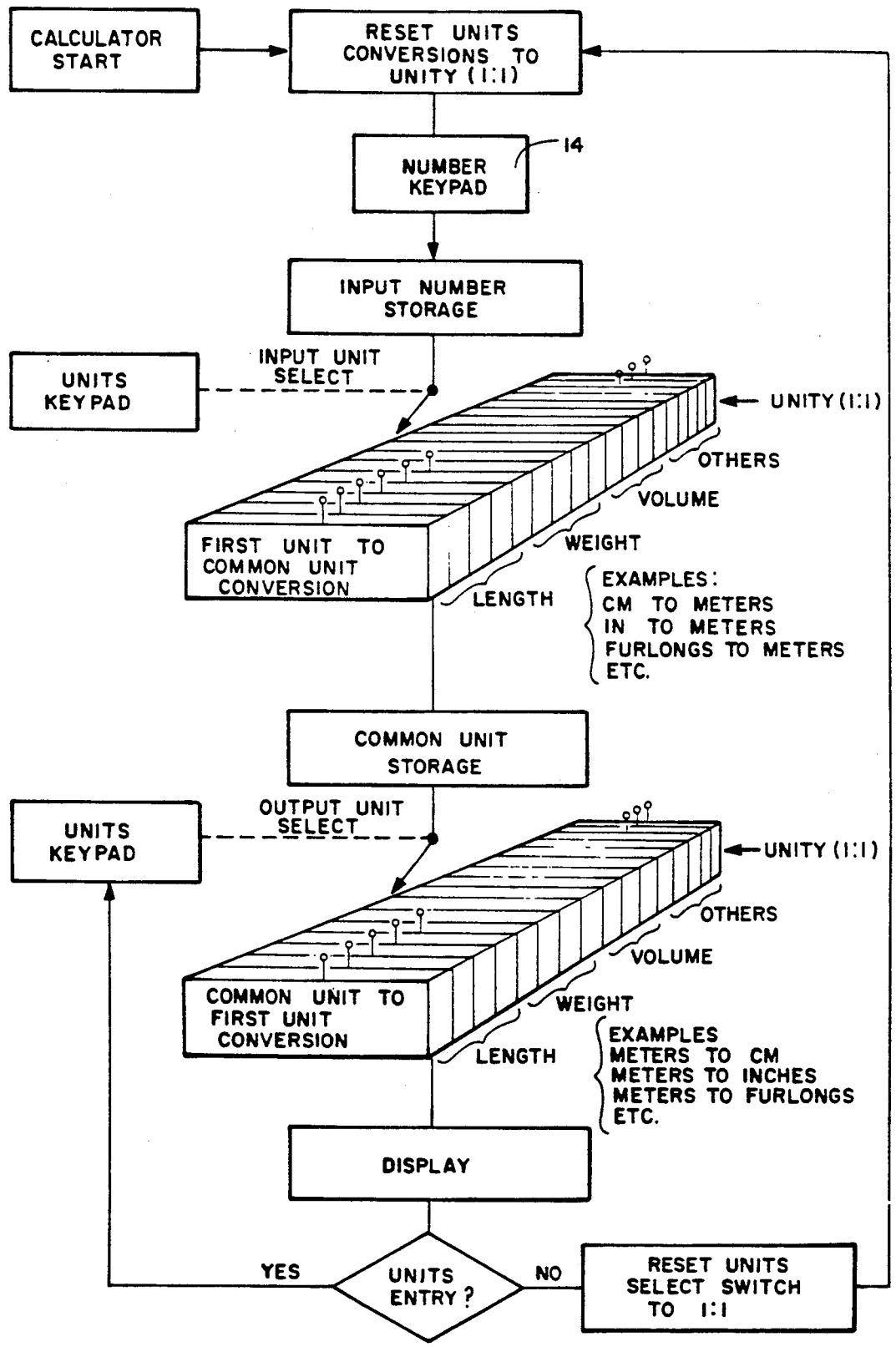
FIG. 3 is a flow diagram of the operation of the embodiments of the invention.

Referring now specifically to drawing FIG. 3 which depicts a flow diagram of the operation of the first embodiment:

The operational sequence begins at the top left hand side of the drawing Figure. The calculator of the invention is energized and is automatically reset to the 1:1 unity mode. A numerical entry is made using the number keys and units of the number of the number entry is inputed via the keys of the keyboard. A selected unit measurement key associated with the numerical keys proceding is then depressed. The imputed number is then converted to the appropriate common unit measurement and the result is placed in storage. The desired output unit is then selected, the appropriate key or keys are depressed and the common unit from storage is then converted from the common unit to the desired chosen unit of measure. The result is shown on the display.

Additional units can be entered. This will result in the conversion of the common unit to the selected unit and the results displayed on the LCD. Similar results will be obtained for additional units selection. A new numerical entry will reset the units selection.

While there has been described what is considered to be the preferred embodiments of the invention, variations and modifications therein will occur to those skilled in the art once they become familiar with the basic concepts of the invention. Therefore, it is intended that the appended claims shall be construed to include all such variations and modifications as fall within the true spirit and scope of the invention.

What is claimed is:

1. A hand held calculator for converting an undesirable unit of measurement to a different desirable unit of measurement comprising:

keys for inputing numerals representing said undesirable unit of said measurement and keys for choosing said desirable unit of measurement to which said undesirable unit is to be converted;

first circuit means for converting said undesirable unit of measurement entered by said keys into a standard unit of measurement;

storage means for temporary storage of said standard unit of measurement;

second circuit means for converting said temporary stored standard unit of measurement into said different desirable unit of measurement; and visual display means for first displaying the inputed undesirable unit of measurement and then when one of said keys for choosing said different desirable unit of measurement is depressed displaying said different desirable unit of measurement.

2. The calculator as defined in claim 1 wherein said keys include indicia related thereto indicating their function.

3. The calculator as defined in claim 1 wherein said storage means, first circuit means and said second circuit means comprise a microprocessor means.

4. The calculator as defined in claim 1 wherein said first circuit means comprises a conversion logic circuit and a common units storage circuit.

5. The calculator as defined in claim 1 wherein said second circuit comprises a conversion logic circuit.

6. The calculator as defined in claim 1 wherein said visual display means is a liquid crystal display.

7. The calculator as defined in claim 1 wherein said storage means and first and second circuit means comprises a micro processor.

8. A method of converting an undesirable unit of measurement into a desirable different unit of measurement comprising the steps of:

providing means for entering said undesirable unit of measurement into a first converting circuit;

converting within said first converting circuit said undesirable unit of measurement into a standard unit of measurement;

inputing said standard unit of measurement into a temporary storage circuit;

providing a second converting circuit for converting said standard unit of measurement in said temporary storage into a desirable unit of measurement; and displaying said desirable unit of measurement on a visual display.

* * * * *